July 6, 1965  E. B. POOL ETAL  3,193,247
SEQUENTIALLY SEATED VALVE
Filed Feb. 28, 1962
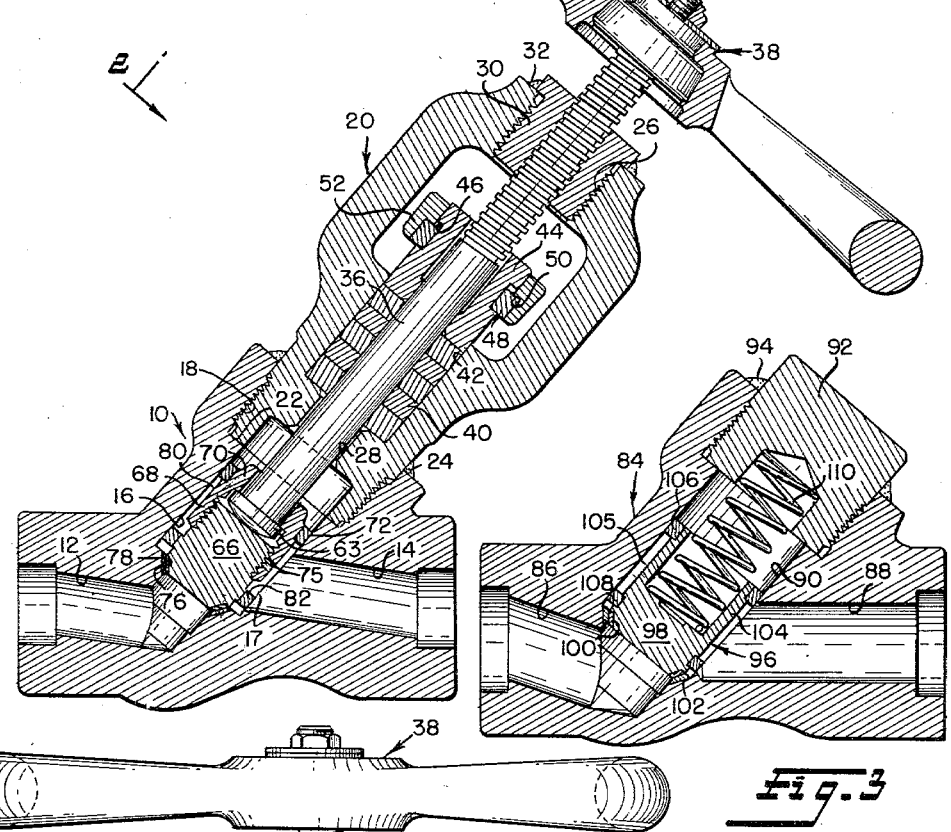
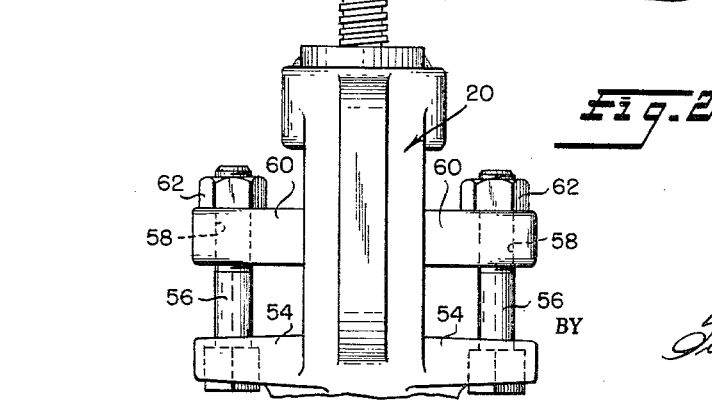
INVENTORS
Eldert B. Pool
William G. Lunt
Donald J. Easton
BY
ATTORNEYS

United States Patent Office 3,193,247
Patented July 6, 1965

3,193,247
SEQUENTIALLY SEATED VALVE
Eldert B. Pool, Palos Park, William G. Lunt, Dolton, and Donald J. Easton, Chicago Heights, Ill., assignors, by mesne assignments, to Rockwell Manufacturing Company, Pittsburgh, Pa., a corporation of Pennsylvania
Filed Feb. 28, 1962, Ser. No. 176,201
2 Claims. (Cl. 251—210)

This invention relates to valves and more particularly to improved valves especially of the globe and angle type for high pressure service.

It is the principal purpose and object of the present invention to provide improved valves for high pressure service which have an increased service life; which materially reduce lateral loads on the disc; which eliminate remaining lateral forces from the slender stem; which stabilize the valve closure member from vibration; which facilitate proper seating of the valve closure member; and which materially reduce pressure losses in check valves.

While the invention in certain aspects is applicable to a variety of types of valves, it will be described as applied to globe stop valves and check valves.

In prior stop valves and stop check valves most of the wear has been concentrated on the stem and stem bearings and the disc nut. This wear occurs because of a number of factors. For example, prior valve discs are generally guided by the stem in their movement toward and away from the valve seat. Accordingly, the lateral loads developed by the unbalanced pressure tending to move the disc toward the downstream side of the valve when flow is under the seat are transmitted directly to the stem and the stem bearings. These forces are of such magnitude that they may produce severe galling of the parts or may bend the stem. This condition is aggravated in most prior valves by the construction of the disc and the adjacent body structure which tend to maximize the unbalanced loads. When full line pressure is applied to the upstream side of the valve disc the pressure differential thereacross, in addition to producing severe side loads often causes vibration which produce unusual characteristics and causes the valve to be self-opening. In addition, the high lateral loading may cause the disc to tilt rendering subsequent seating of the disc difficult, since most typical frusto-conical seats are not self-centering under a central load and thus remain tilted at all stem loads, requiring local plastic deformation to form a seal.

In accordance with the present invention, these problems are solved by the provision of improved valve bodies and discs which cooperate in combination to eliminate the lateral load on the stem, and to transmit the reduced load on the disc directly to the valve body and thus eliminate the chief cause of difficulty in prior construction.

More specifically, the present invention as applied, for example, to globe valves, provides a disc which is guided on body surfaces rather than on the stem. The body guide surfaces maintain the disc in proper relation with the valve seat without the development of high local stress. The invention further provides improved disc and body construction so arranged as to prevent the establishment of high side loads when pressure is under the seat by preventing the transmission of the high upstream line pressure to the upstream region of the disc. Thus, the gross lateral loads are reduced and the load thus reduced is transmitted to the body rather than the stem. Finally, the cooperating disc and body surfaces are arranged to maintain the disc in proper alignment with the valve seat to permit the formation of a drop-tight seal with minimum axial stem load. The same structure which provides for reduced lateral loads also substantially increases disc lifting loads. This is important in check and stop-check valves which operate at higher lift with less vibration and pressure loss.

Additional objects and advantages of the present invention will become apparent as the description proceeds in connection with the accompanying drawings, in which:

FIGURE 1 is a central vertical section of a stop valve embodying the present invention;

FIGURE 2 is a fragmentary side elevation looking in the direction of arrows 2—2 in FIGURE 1; and FIGURE 3 is a section similar to FIGURE 1, showing a check valve.

Referring more particularly to FIGURES 1 and 2, the valve thereshown comprises a one-piece body 10 having ports 12 and 14, which communicate at their inner ends with an internal chamber 16, which opens at its upper end to the exterior of the body. Since the chamber 16 and the passage 14 are cylindrical their intersection forms an elliptical opening 17 with advantages which will be explained below. At its upper end the cylindrical chamber 16 is enlarged to provide a threaded counter-bore 18 which receives the lower threaded end of a combined yoke-bonnet assembly indicated generally at 20. The assembly 20 is threaded into the enlarged counter-bore 18 until its lower end abuts against the shoulder 22 formed at the inner end of the counterbore 18 and the assembly 20 is held in place by an annular weld 24 which seals the joint.

The yoke assembly 20 is provided with upper and lower coaxial openings 26 and 28, the former being threaded for reception of a yoke-bushing 30 held in place by one or more tack welds 32. The upper threaded end of the stem 36 is threaded into the yoke-bushing 30 and its lower portion extends through the lower yoke opening 28 into the valve chamber 16. At its upper end the stem is provided with a conventional hand wheel assembly 38.

The stem packing 40 is compressed in a chamber 42 formed in the yoke assembly around the mid-portion of the stem by a gland 44. Received within a recess 46 in gland 44 is a split ring 48, the outer surface of which is received within a recess 50 in a gland flange 52 which telescopes over ring 48 and holds it in position. As best shown in FIGURE 2, the yoke 20 is provided with oppositely extending ears 54 apertured to receive a pair of gland bolts 56 which extend upwardly through openings 58 in laterally projecting ears 60 formed integrally with the ring 52. Nuts 62 threaded on the upper ends of the gland bolts 56 are provided to adjustably compress the packing 40.

The welded body-yoke construction thus far described permits use of the valve in controlling the flow of fluid at very high pressures.

The lower end of the stem 36 is provided with an integral collar portion 63 rotatably received in the space between the disc 66 and a disc nut 68 threaded into disc 66. The disc nut has a cap portion 70 which is provided with a projecting bearing or guide ring 72 of stellite or similar wear resistant material. The ring 72 is received with a close clearance fit within the chamber 16.

Preferably the disc nut is held in place by plug welding in the hole 75. Even if the weld breaks the nut threads are so mutilated that loosening cannot occur accidentally. This method of fastening the disc to the stem permits rotation of the stem when the disc is seated without rotating the disc, thereby reducing the abrasive wear of the seating surface.

The periphery of the bottom portion of the disc 66 is provided with a hardened seating surface 76 of frusto-conical configuration which is adapted to sealingly engage the frusto-conical surface 78 formed at the lower end of the chamber 16 in the valve body. The seating surfaces 76 and 78 are of stellite or similar abrasive resistive material and may be formed by the method shown in Patent 2,903,564.

It will be noted that the diameter of the main body portions of the disc nut and the diameter of the disc are substantially smaller than the diameter of the valve body chamber 16 to provide an annular clearance space 80 of substantial width between the parts. Adjacent to its lower end the disc is provided with wear and guide rings 82 which may be formed integrally with the disc body or may be of hardened material such as stellite deposited on the disc body in accordance with the method shown in the aforesaid United States Patent 2,903,564. The wear and guide rings 72 and 82 are received with a close clearance fit within the cylindrical bore of the valve chamber 16. Many of the advantages of the present invention are derived from the unique construction of the disc and associated valve body construction as will become apparent from the description of the operation of the valve.

For present purposes, let it be assumed that the valve is tightly closed as shown in FIGURE 1, and that fluid under high pressure is supplied through the inlet passage 12. In a typical case, the fluid to be controlled may be supplied at a pressure up to 9000 lbs. per square inch. The valve may be moved toward its open position by rotating the hand wheel 38 which also rotates the stem 36. Because of the rotatable connection between the stem and the disc 66, the latter is not rotated at least until after the high seating pressure has been relieved. As the stem and disc assembly move upwardly in chamber 16, the disc is guided by the rings 72 and 82 within the body structure, thus eliminating any tendency of the disc to cock, and at the same time eliminating any possibility of the imposition of lateral loads upon the stem since stem clearance exceeds body clearance. If the cylindrical chamber diameter is sufficiently larger than the intersecting port diameter adequate bearing surface is available. This feature, by itself, eliminates a principal cause of wear associated with most prior valves, because the stem is ill-equipped by its slender overhanging shape to take side loads.

However, a further and perhaps more important advantage is derived from the positioning of the lower guide ring 82 and the cylindrical configuration of the valve body chamber 16. The lower thrust or guide ring 82, in addition to being a bearing, effectively seals most of the disc from line pressure, allowing the downstream pressure to envelope uniformly the portion of the disc above the ring. The sealing action of the lower ring 82 reduces the forces which tend to suck the disc toward the outlet passage by a factor of 4. It is important that the lower thrust or guide ring 82 be as close to the bottom of the disc and as narrow as practical, since only the side projected area above this ring enjoys freedom from laterally directed differential pressure, which otherwise produces objectionable side thrust.

It is also to be noted that because of the absence of body relief in the chamber 16, that is, by the utilization of a valve chamber 16 having a cylindrical configuration, the sealing action of the lower ring is maintained at all positions of the disc.

The body relief used in most prior valves of this type or simply the lack of a close fitting ring 82 permits divided flow under and over the disc at certain disc positions. Divided flow may cause variable pressure patterns over and under the disc causing the disc to vibrate. Excess vibration may peen the guiding surfaces increasing clearances and complete destruction of the guiding surfaces may follow. In milder forms the stem vibration encountered in prior valves increases packing leakage and may necessitate frequent packing adjustments. All of these troubles encountered in prior valves are avoided by the combined operation of the lower thrust ring, and the absence of body relief in the portion of the body opposite the outlet, since substantial flow over and behind the disc is prevented.

The positioning of the upper guide or thrust ring 72 at the upper end of the disc, together with the positioning of the narrow lower thrust ring 82 as close to the lower portion of the disc as practical, substantially reduces the tilt of the disc as it approaches the seat.

This is particularly important during the closing action of the valve since frusto-conical seats are not self-centering under a central load for angles commonly used and coefficients of friction commonly encountered and will stick when they first make wedging contact requiring excessive load and local plastic deformation to form a seal.

The unique configuration of the disc and the associated valve body structure also provides a substantially improved throttle curve (flow coefficient v. lift). It is generally recognized that a throttle valve should control flow more sensitively at low lifts, and less so at higher lifts. This requires an upward curvature to the throttle curve. To obtain this result, commonly called "equal percentage," prior valves must incorporate projections below the seat of a parabolic or V-port type. These projections, however, create side thrust and vibration problems. The valves of the present invention have this characteristic naturally thus eliminating the need for these projections and at the same time avoiding the problems of side thrust and vibration, which they cause. This desirable throttle curve results from throttling between the lower disc ring and the outlet port 17 rather than between conical seats. The opening is an increasing segment of the outlet circle or ellipse.

Other advantages of the invention are realized when the disc and body structure are used in a check valve or a stop-check valve. A globe check valve is illustrated in FIGURE 3, to which detailed reference will now be made.

The check valve of FIGURE 3 comprises a body 84 of essentially the same configuration as the valve of FIGURES 1 and 2, having flow passages 86 and 88 intersecting a cylindrical valve chamber 90. The upper end of the chamber 90 is closed by a cover 92 threaded into an enlarged counter-bore at the upper end of the chamber 90. The cover is locked in place and sealed by an annular weld 94.

The valve disc 96 is of cup-shaped form having a bottom wall portion 98 provided with a hardened seating surface 100 adapted to sealingly engage a hardened valve seat 102 when the valve is closed. The cylindrical main body portion 104 of the disc has a diameter substantially less than the diameter of the chamber 90 to provide a substantial clearance space 105 between the parts. Upper and lower hardened wear and guide rings 106 and 108 are provided adjacent to the upper and lower ends of the valve disc and in close clearance relation with the wall of chamber 90. A coil spring 110 is compressed between the disc 96 and the cover 92 to urge the disc toward closed position. In this type of valve, the valve disc 96 is moved away from the seat only by action of the fluid pressure differentials. Because of the positioning of the ring 108, and the cylindrical configuration of the valve chamber 90, the lifting efficiency of the disc is substantially improved as compared with prior valves of this type. Also friction against the guide is reduced because of reduced side thrust. Thus a higher lift is obtained at a given flow with resulting reduced pressure loss. This result is obtained because of reduced pressure in the region above the lower thrust ring 108. This pressure more nearly approaches the outlet pressure than in prior valves and in this respect the valve achieves a performance obtainable heretofor only by the use of external pipes or pressure equalizer mechanisms.

Also, as in the case of the valve of FIGURES 1 and 2 the wear and guide rings 106 and 108 in cooperation with the cylindrical wall of chamber 90 prevent cocking of the disc thus causing tight seating of the disc even under low pressure.

The invention may be embodied in other specific forms without departing from the spirit or essential characteristics therefore. The present embodiments are therefore to be considered in all respects as illustrative and not restrictive, the scope of the invention being indicated and all changes which come within the meaning and range of equivalency of the claims are therefore intended to be embraced therein.

What is claimed and desired to be secured by Letters Patent is:

1. A valve comprising a body having inlet and outlet passages communicating at their inner ends with a cylindrical valve chamber, means providing a conical seating surface adjacent the intersection of said inlet passage and the lower end of said chamber, a valve disc positioned in said chamber for movement toward and away from said seating surface, a yoke carried by said body, a valve stem supported by said yoke, means connecting the lower end of said stem to said disc to prevent substantial relative movement of said stem and said disc axially of said stem while permitting said stem to rotate or to move radially a predetermined distance with respect to said disc, said disc having a bottom wall portion provided with a conical seating surface adapted to sealingly engage said seating surface in said valve chamber to close said valve and having an elongated body portion of a diameter substantially less than the diameter of said valve chamber, and relatively narrow upper and lower wear and guide ring portions positioned adjacent the opposite ends of said disc body portion and projecting outwardly therefrom into close clearance relation with the wall of said valve chamber to guide said disc in its movement toward and away from said valve chamber seating surface, the radial clearance between said upper and lower ring portions and said valve body chamber being less than the radial clearance between said stem and said disc and the lower wear ring portion being adjacent the bottom of said outlet opening when said valve is closed, and said lower wear ring portion cooperating with said valve chamber wall to prevent the passage of high pressure fluid from said inlet opening to the region of said disc body portion above said lower ring portion to thereby materially reduce the side thrust tending to urge said disc toward said outlet opening.

2. The valve according to claim 1 wherein the lower edge of said lower ring portion is positioned immediately adjacent the bottom of said outlet opening, and at all times except when said valve is closed, forms a flow passage of smaller area than the passage between the said seating surfaces whereby when said disc is initially moved away from closed position said lower ring portion throttles the fluid flowing from said inlet passage to said outlet passage.

References Cited by the Examiner

UNITED STATES PATENTS

| | | | |
|---|---|---|---|
| 662,249 | 11/00 | Cadman | 251—84 XR |
| 2,082,223 | 6/37 | Smith | 251—84 XR |
| 2,748,798 | 6/56 | Withrow | 137—533.17 |
| 2,903,564 | 9/59 | Carr | 251—368 XR |

ISADOR WEIL, *Primary Examiner.*
MARTIN P. SCHWADRON, *Examiner.*